Sept. 7, 1965 J. A. SHANNON 3,204,544

PHOTO-LIGHT PAINTING APPARATUS

Filed June 14, 1962 7 Sheets-Sheet 1

*INVENTOR.*
JOSEPH A. SHANNON
*BY* A H Oldham
ATTORNEY

Sept. 7, 1965 J. A. SHANNON 3,204,544

PHOTO-LIGHT PAINTING APPARATUS

Filed June 14, 1962 7 Sheets-Sheet 2

*INVENTOR.*
JOSEPH A. SHANNON

*BY* A. H. Oldham

ATTORNEY

INVENTOR.
JOSEPH A. SHANNON
BY [signature]
ATTORNEY

Sept. 7, 1965 J. A. SHANNON 3,204,544

PHOTO-LIGHT PAINTING APPARATUS

Filed June 14, 1962 7 Sheets-Sheet 4

INVENTOR.
JOSEPH A. SHANNON

BY A. H. Oldham

ATTORNEY

Sept. 7, 1965 J. A. SHANNON 3,204,544

PHOTO-LIGHT PAINTING APPARATUS

Filed June 14, 1962 7 Sheets-Sheet 5

*INVENTOR.*
JOSEPH A. SHANNON

*BY* S. H. Oldham

ATTORNEY

PHOTO-LIGHT PAINTING APPARATUS

Filed June 14, 1962 7 Sheets-Sheet 6

INVENTOR.
JOSEPH A. SHANNON
BY A. H. Oldham
ATTORNEY

INVENTOR.
JOSEPH A. SHANNON
BY
[signature]
ATTORNEY

United States Patent Office 3,204,544

Patented Sept. 7, 1965

3,204,544
PHOTO-LIGHT PAINTING APPARATUS

Joseph A. Shannon, Akron, Ohio, assignor to Goodyear Aerospace Corporation, a corporation of Delaware Filed June 14, 1962, Ser. No. 202,575
7 Claims. (Cl. 95—76)

The present invention relates to an apparatus and method for photo-light painting an image on a light sensitive film, and, more particularly, to apparatus and method for photo-light painting of printed circuits and commercial art work.

The etched circuit process is a widely used method of producing printed circuits. It consists of applying to a copper-clad laminate an acid resistance coating which conforms to the desired circuit pattern. The laminate is then immersed in an acid etching solution and the unwanted copper material is etched away, leaving a thin conducting pattern bonded to the laminate.

One of the most accurate and widely used methods of applying an acid resist pattern to the copper is by the photo-resist process. In the process, a photo-sensitive emulsion such as Eastman Kodak Company's KPR is applied to a thoroughly cleaned surface of the copper. A photographic negative of the circuit pattern drawing is used to make a contact print on the prepared copper-clad panel. The negative is placed in contact with the coated surface in a printing frame. The frame holds the negative tightly against the treated surface of the panel during exposure to an arc or photo-flood lights. After exposure, the emulsion is developed by immersion in the solvent which dissolves the unexposed portion of the photo-emulsion. The remaining light-hardened portion of the emulsion conforms to the desired circuit pattern and acts as an acid resist during the etching operation.

Screen stencil printing is another method used to apply acid resistant ink to the copper surface in the desired circuit pattern. The stencil is made by fusing a sensitized polyvinyl alcohol sheet material to the screen mesh with heat. A film positive of the circuit drawing is used to transfer the image of the circuit drawing to the sensitized film. A warm water spray dissolves the unexposed portion of the film leaving a sharp stencil of the circuit pattern.

Heretofore the drawn art work for printed circuits has been executed in black India ink on stable, white board. The circuit pattern is facilitated by the use of self-adhering tapes and shapes made especially for this purpose. Tapes and shapes made from a self-adhering polyester film have been developed to resist acids and solvents. These tapes permit the direct laying out of the circuit on the copper-clad laminate. The film is used as resist in the etching process. Considerable amount of time and skill are necessary to prepare master drawings of a printed circuit from tape and ink. The tape has a tendency to stretch, has pin holes and rough edges. The ink has poor densities and a tendency to crack. The characteristics of tape and ink limit the tolerances of the finished circuits.

It is the general object of the invention to avoid and overcome the foregoing and other difficulties of and objections to the prior art practices by the provision of a relatively simple and inexpensive apparatus and method of making an art work negative from art work drawings with less time and skill.

Another object of the present invention is to provide an automatic method of making art work drawings without the need of an inked or black taped master drawing.

Another object of the invention is to provide a method of making an art work negative that maintains an accurate control over line tolerances enabling the micro-miniaturization of the art work.

Another object of the invention is to provide an apparatus which automatically widens a narrow line, or reduces a wide line, of a layout drawing to any desired width.

Another object of the invention is to provide a method of making an art work negative that contains identical line widths and corner configurations.

According to the invention, the art work is painted with a beam of light on a light sensitive film. Initially, the layout drawing containing the desired circuit image is photographed to make a negative thereof. The negative containing the circuit is positioned in a spaced face to face relation with a light sensitive positive material. The negative and light sensitive material are maintained in substantially parallel planes and are provided with relative circuitous motion. A beam of light passing through the negative paints a positive circuit image on the light sensitive film. The pattern of the original art work and the type of circuitous motion determines the shape of the circuit image on the light sensitive film.

The apparatus for photo-light painting an image on a light sensitive film comprises means for holding a negative film of the circuit image, means for holding the light sensitive film parallel and in spaced face to face relation with the negative film and means operatively connected to one of the holding means to provide relative circuitous motion between said means whereby a source of light passing through the negative film will paint a positive circuit image on the light sensitive film.

The exact nature of the invention as well as other objects and advantages thereof will be readily apparent from a consideration of the following specification relating to the annexed drawing in which.

Figure 1:
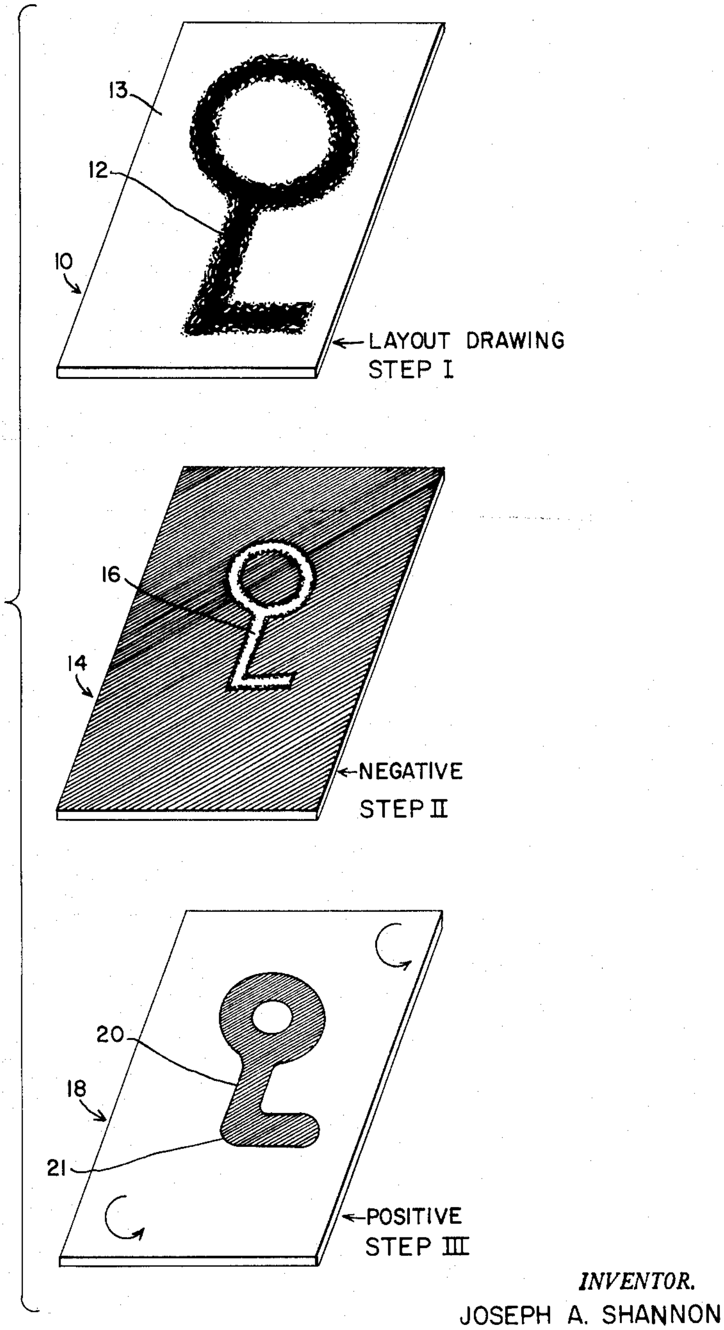
FIG. 1 is a diagram illustrating the basic steps of the photo-light painting method according to the invention.

Referring now to the drawing, there is shown in FIG. 1 the basic three steps of photo-light painting. In Step I a layout drawing 10 having the desired art work 12 is made on a drafting film or paper 13. The art work is made with a single, relatively narrow (approximately .02 inch) pencil or ink lines. The art work 12 shown on sheet 13 is an enlarged single pencil line. This line has non-continuous and irregular lateral edges and transparent void portions. A pencil drawing can be reproduced onto Cronaflex drawing film in order to obtain as dark a line as possible. Dark lines are important because these lines allow the proper amount of light to pass through the negative in order to obtain a proper exposure to the positive film.

In Step II a negative film 14 is made by known photographic processes from the layout drawing 10. The negative film 14 contains the negative image 16 of art work 12 on the layout drawing. The image 16 of the art work 12 is reduced in size to sharpen the lateral edges and reduce the area of the transparent void portions. This photo reduction increases the line tolerances and reduces the physical size of the negative 14.

In Step III the negative film 14 with the negative image 16 is used to photo-light paint art work 20 on the positive film 18. The photo-light painting is accomplished by providing the positive 18 or negative 14 film with circuitous movement in a flat plane during the exposure of the positive 18 by light passing through the negative. The circuitous movement could also be described as not changing the relative orientation of the positive or negative film during the light exposure through the negative. In other words a line in the negative which is parallel to a line in the positive or negative film will remain parallel during the circuitous movement of the film. The circuitous movement is about a pair of parallel axes offset from the center of the film as shown by the lunate arrows on positive 18. This movement provides the art work 20 with rounded outside corners such as corner 21. The rounded outside corner is a basic requirement of miniaturized printed circuits. The continuous movement of the film in the same circuitous path cleans up the irregular lateral edges of the art work and exposes the void portions to produce a positive art work image 20 that has smooth identical line widths, corner configurations, and a co-extensive solid image. This movement also keeps any dust particles present between the films in motion thereby preventing the dust from masking the light sensitive film. The shape of the negative image 16 and the path of the movement of the film determines the area on the positive 18 that is exposed to the light.

The basic step of photo-light painting can be repeated several times. The image on positive film 18 is used to make a negative image. This negative image is used to photo-paint a second positive film. Repeated photo-light painting reduces the tolerances of the final art work by repetitiously cleaning up the non-continuous and irregular art work lateral edges.

The positive film which has been photo-light painted is the working tool for making the screen stencil used in the screen printing process described above. The positive film 18 is used to make a negative film to be used in the photo-resist process described above. The negative made from the positive film 18 may be reduced in size to miniaturize the art work. The art work made by this process is of higher quality than the art work made by the present ink and tape methods. This is based on the control available over the tolerances obtainable from the single line layout drawing.

Figure 2:
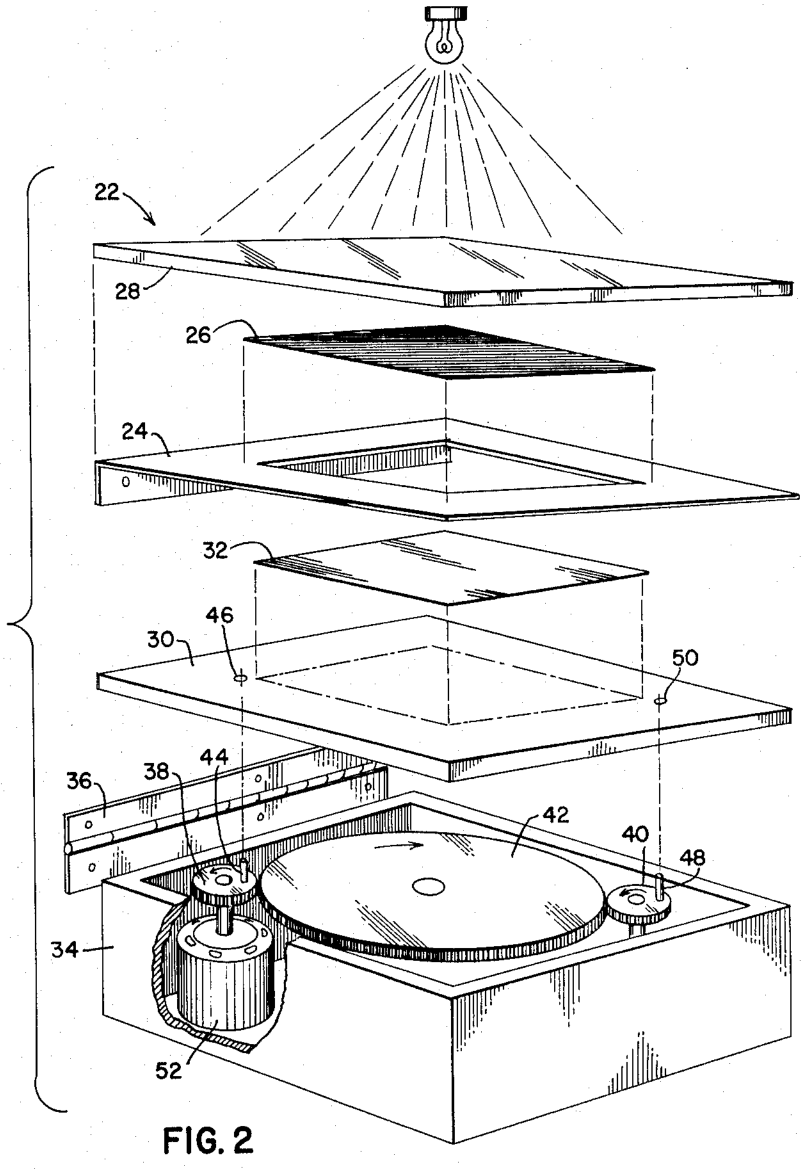
FIG. 2 is an exploded view of a contact printer used for photo-light painting.

Referring to FIG. 2 there is shown a contact printer 22. The contact printer 22 is composed of a frame type negative holder 24 adapted to support the negative film 26. The negative film 26 contains the negative image of the art work on the layout drawing. A clear glass plate 28 is positioned over the negative and negative holder. The glass plate functions as a support and maintains the negative in a substantially flat plane. A plate 30 having a smooth surface supports an unexposed light sensitive positive film 32. The plate 30 is mounted on a frame 34 in spaced side by side relation with the negative film 26. A hinge 36 secured to the frame 34 and the negative holder 24 aligns the negative holders over the plate 30.

A drive gear 38, driven gear 40, and idler gear 42 connecting the drive gear with the driven gear are rotatably mounted within the frame 34. The rotative axis of the drive and driven gears is substantially normal to the smooth surface of the plate 30 and offset from the center of said surface. A pin 44 mounted on the drive gear 38 offset from the axis of rotation thereof extends into a hold 46 in the plate 30. A pin 48 secured to the drive gear 40 and offset from the axis of rotation thereof extends into the hole 50 of the plate 30. A motor 52 drives the drive gear 38 to rotate the plate 30 about the axis of rotation of the drive and driven gears.

Exposing the light sensitive positive film 32 with light passing through the negative will paint a positive image on the film 32. Rotation of the plate 30 during the exposure time enlarges and smooths the line width of the art work being formed on the positive film 32. If a reverse negative is used, rotation of the plate 30 during exposure reduces and smooths the line width.

Figure 3:
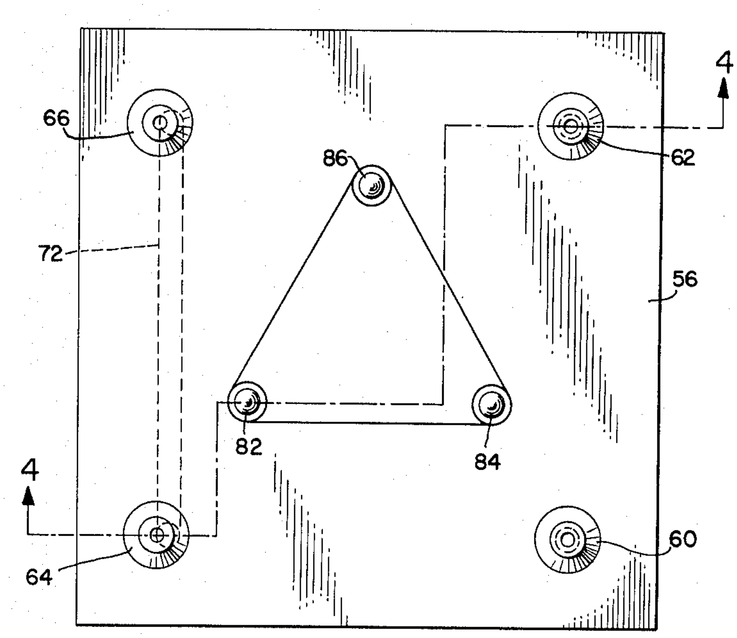
FIG. 3 is a plan view of an easel support usable for photo-light painting, which has adjustable circular motion.
Figure 4:
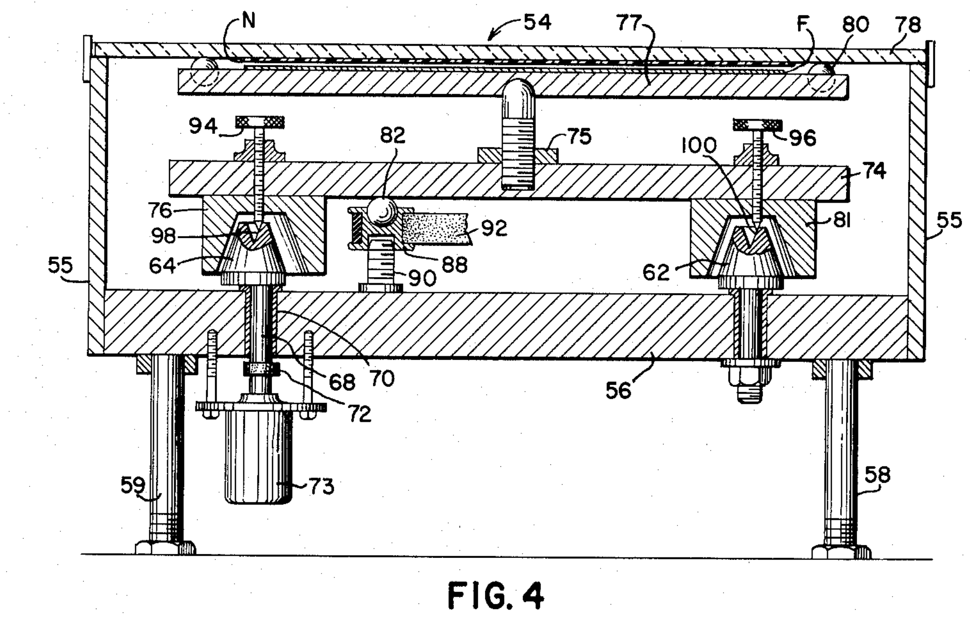
FIG. 4 is a section view of the entire easel of FIG. 3 taken along the line 4—4.

Referring to FIGS. 3 and 4, there is shown an easel 54 which may be used with a contact printer or a photographic enlarger. The easel contains a frame 55 and a horizontally extending support 56. The support 56 is spaced above the base surface by adjustable legs 58 and 59. Secured to adjacent corner portions of the support are a pair of tapered male guides 60 and 62. A pair of eccentric tapered male guides 64 and 66 are rotatably mounted on the horizontal support 56 in the opposite corner portions. Each eccentric tapered male guide is secured to a shaft 68 extending transversely through the sleeve bearing 70 in the support 56. A power transmission belt 72 extends between the shafts 68 of the eccentric tapered male guides 64 and 66. The belts may be made from a material which contains hooks or loops which cooperate with oppositely shaped hooks or loops on the shafts 68. This structure functions to eliminate the slippage between the belt and the driven shafts. A motor 73 removably fastened to the support 56 is drivingly secured to shaft 68 to rotate the eccentric tapered male guides.

A floating plate 74 having a smooth upper surface is horizontally positioned above the support 56. An adjusting stud 75 supports a film supporting member 77 on the floating plate 74. The member 77 has a smooth upper surface adapted to receive light sensitized film F. A transparent plate 78 such as glass is supported on the frame 55 above the member 77. The film supporting member 77 is spaced a fixed distance from the plate 78 by a plurality of spherical rollers 80. The negative N containing a negative image of the art work is held on the bottom surface of the glass plate 78 by a vacuum force. Alternatively, the negative may be positioned in the film holder of an enlarger. The light passing through the negative projects an image upon the film F.

Secured to the lower surface of the plate 74 are female tapered members 76 and 81. The female tapered member sare complementary to the male tapered guides and slightly larger than said male guides. Female member 76 is magnetized to attract and hold it against the surface of the tapered eccentric male guide 74. Triangular spaced bearings 82, 84, and 86 are positioned between the support 56 and the plate 74 to rotatably support the floating plate 74. Each bearing is positioned in a mounting nut 88 which is adjustably positioned on a bolt 90. The bolt 90 is fastened to the support 56. A belt 92 engages the bolt 90 and movement thereof adjusts the relative position of the plate 74 to the support 56. The lateral distance between the plate 74 and the support 56 adjusted by the mounting nuts 88 controls the diameter of the circuitous movement of the plate 74. The degree of eccentricity of the tapered face of the eccentric guide 64 decreases toward the apex of the guide. This decrease in eccentricity decreases the circulatory movement of the plate 74.

A plurality of set screws 94 and 96 transversely extend through the plate 74 into recesses 98 and 100 in the tapered male guides. When the set screws are turned down the plate 74 is in a central fixed position. It cannot be rotated. The function of the centering set screws is to permit the plate 74 to be centered and held in a fixed position so that tool holding patterns, registry targets, part numbers, and any other items may be accurately positioned on the light sensitive film placed upon the upper surface of the plate 77 prior to photo-light painting of the film.

Figure 5:
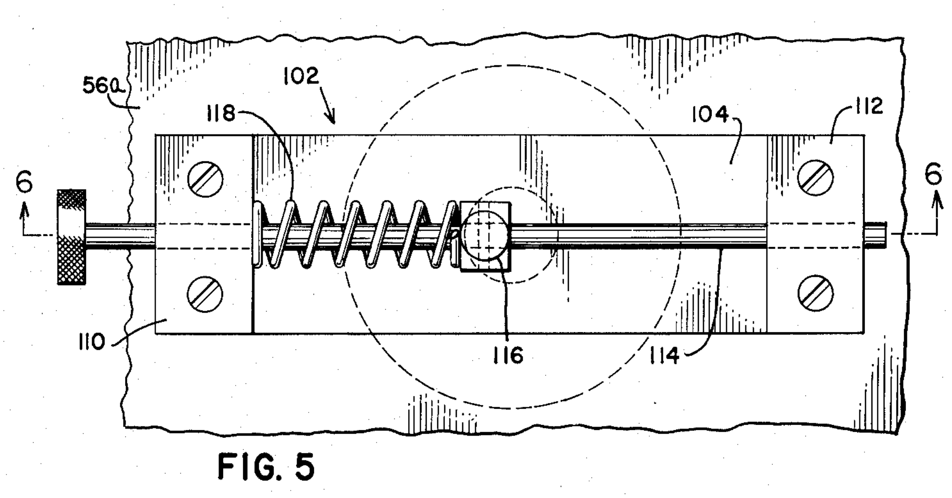
FIG. 5 is a plan view of a modified rotating mechanism for the easel of FIG. 3.
Figure 6:
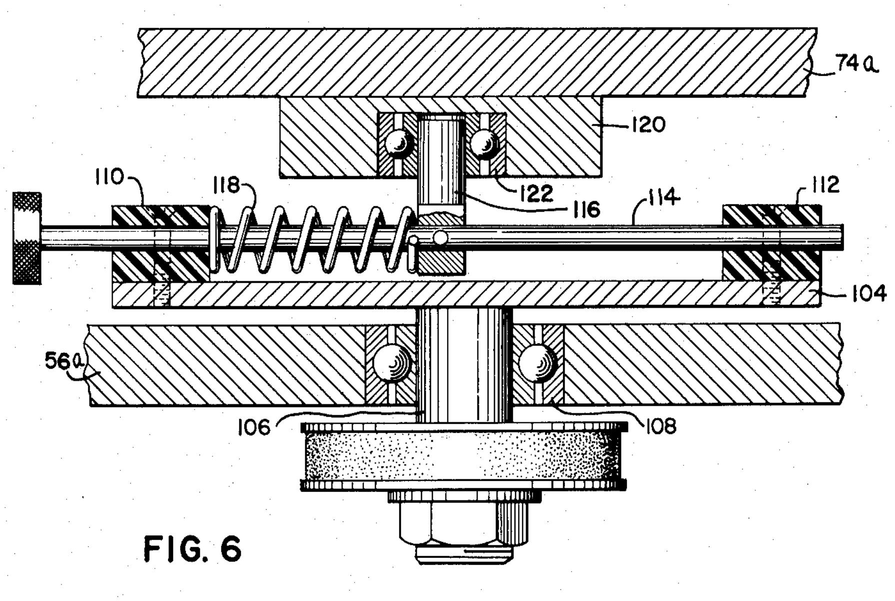
FIG. 6 is a cross-sectional view of the mechanism of FIG. 5 taken along the line 5—5.

Referring to FIGS. 5 and 6, there is shown a modified drive mechanism for the film supporting plate 74*a*. The drive mechanism 102 comprises a plate 104 mounted on a power driven shaft 106. The shaft 106 is vertically positioned in the support plate 56a by bearings 108. A pair of Teflon end blocks 110 and 112 are secured to the ends of the plate 104. A rod 114 is slidably mounted within the blocks 110 and 114 parallel to the plate 104. The rod 114 extends between the end blocks. A vertically extending slide 116 is fixedly mounted on the rod 114. A spring 118 resiliently positions the slide 116 and the rod 114. The free length of the spring 118 is such that the axis of rotation of the shaft 106 is offset from the vertical axis of the slide 116. The upper portion of the slide 116 is rotatably connected to the central portion of the film carrying plate 74a by means of a bearing block 120 and bearing 122. Rotation of the drive shaft 106 will move the plate 74a in a circular path around the axis of the shaft 106. The spring 118 functions to resiliently urge the plate 74a to a position offset from the center of the shaft 106.

Referring to FIGS. 7 to 10 there is shown a modified photolight painting easel 124 having a stationary film carrying plate 126 supported on a frame 128. A plurality of vertically adjustable studs 130 space the stationary film carrying plate 126 above the top of the frame. The studs extend into notches 132 to permit the quick removal of the plate 126 from the easel. The plate 126 supports a flat transparent member 134, such as a glass plate, in a substantially horizontal plane. The plate 126 surrounds the peripheral edges of the transparent member 134. Positioned between the lower surface adjacent the peripheral edges of the member 134 and the plate 126 is a flexible fluid impervious shroud 136. The shroud functions to overlap the peripheral edges of a film placed on the lower surface of the transparent member 134. The shroud forms a chamber around the peripheral edges of the film which is evacuated to hold the film against the lower surface of the member in a flat position. The vacuum is supplied to the connection 138 by the vacuum pump 140 via the flexible conduit 142.

A movable film carrying plate 144 is supported on the frame 128 by two pairs of normally disposed rods 146 and 148. The rods 146 are secured to the top portion of the frame means by brackets 150. The rods 148 are secured to the lower surface of the movable plate 144 by means of brackets 152. Rod couplings 154 having vertically spaced and normally disposed bores interconnect the rods 146 and 148 at their points of intersection. The rods and rod couplings permit the plate 144 to have universal or catholic movement in the plane parallel to the plane of the lower surface of member 134.

Figure 7:
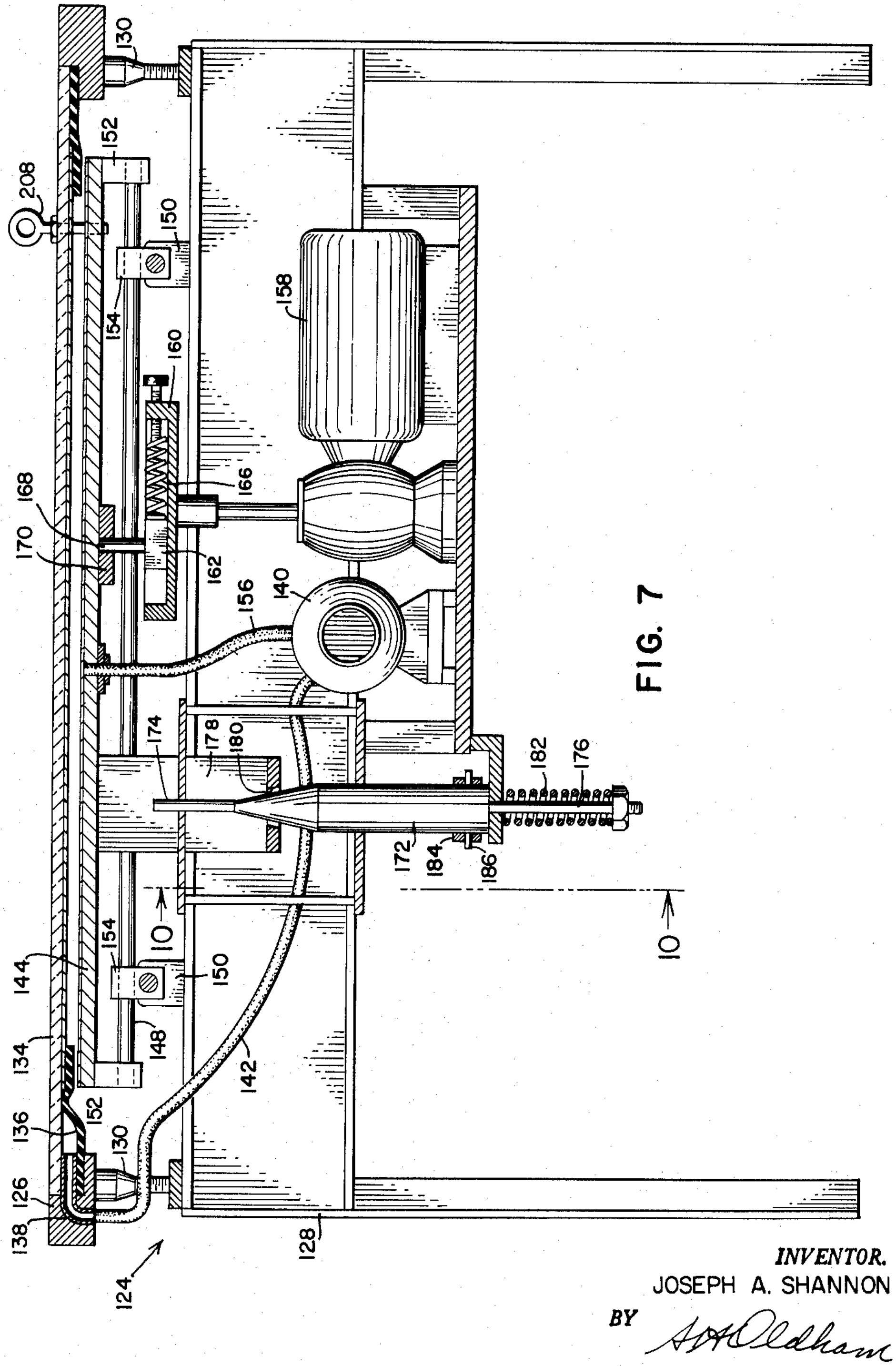
FIG. 7 is a section view of a modified photo-light painting easel.
Figure 8:
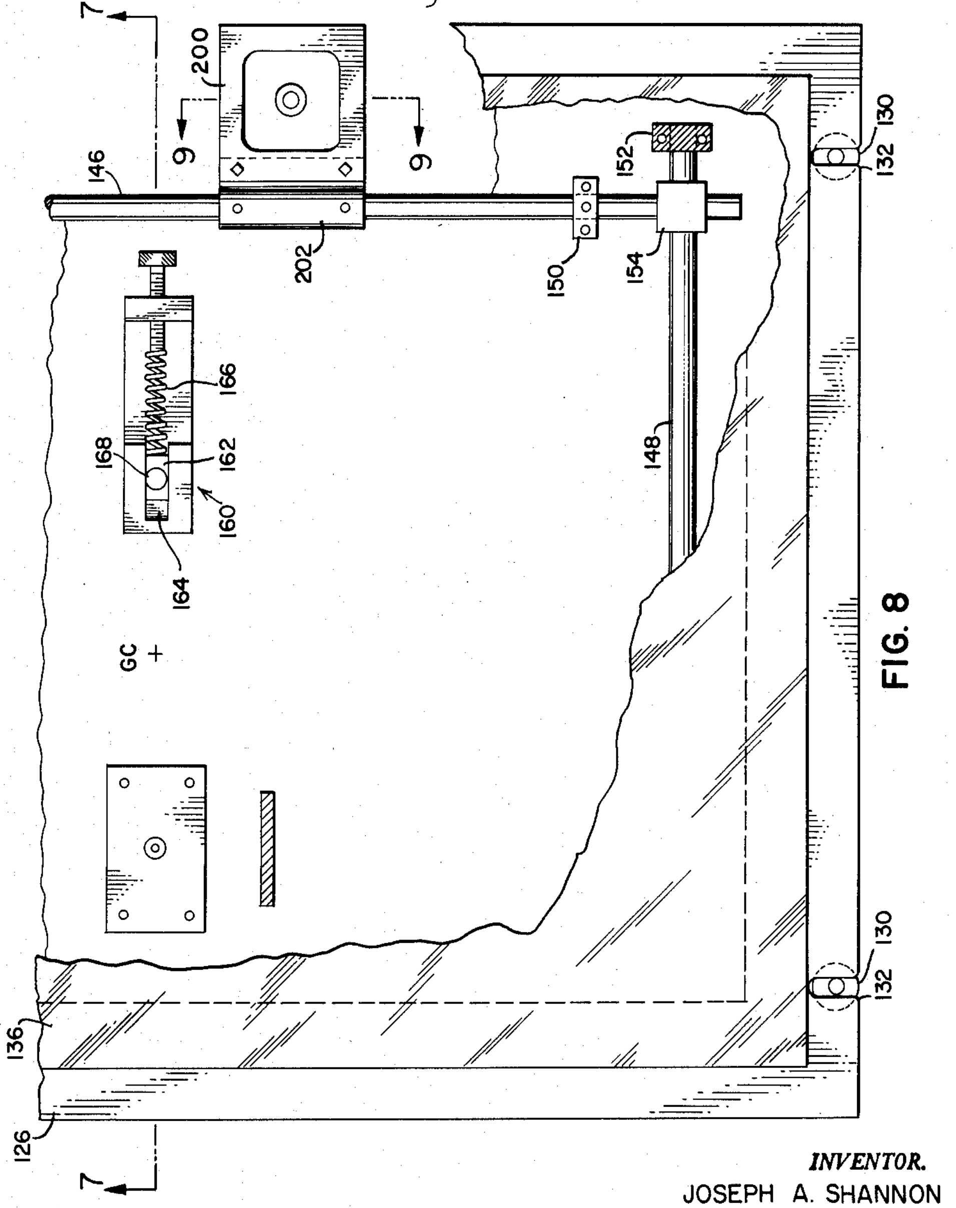
FIG. 8 is a plan view of the modified photo-light painting of FIG. 7 having part of the top plate removed.

A light sensitive film is held on the upper surface of the plate 144 by means of a vacuum from the vacuum pump 140. The vacuum is applied to the plate 144 by a flexible conduit 156. A motor 158 connected to the lower surface of the movable plate 144 by means of a spring based coupling 160 provides the plate 144 with oscillatory movement. As shown in FIGS. 7 and 8, the spring biased coupling 160 comprises a slide 162 biased in a groove 164 by an adjustable compression spring 166. The slide 162 has a vertical extending stud 168 which is coupled to a block 170 secured to the lower surface of the movable plate 144. The spring 166 moves the vertical axis of the stud 168 out of alignment with the vertical axis of the motor drive shaft. The eccentric position of the axis of the stud 168 is the basis of the oscillatory movement of the movable plate 144.

An amplitude control means is operatively connected to the lower surface of the movable plate 144. The spring biased coupling and the amplitude control means are equally spaced from the geometric center (GC) of the plate 144. The amplitude control means includes a vertically extending cone 172 having upper and lower guide portions 174 and 176. The cone 172 is vertically movable into a bracket 178 having a conical recess 180. The amount of clearance between the recess 180 and the conical surfaces of the cone 172 determine the amplitude of the oscillatory motion of the movable plate 144. The upper portion 174, the body portion, and the lower portion 176 of the cone extend through horizontal members of the frame 128 and are guided for vertical movement therein. A compression spring 182 positioned between a portion of the frame 128 and the end of the lower portion 176 of the cone 172 urges the cone downwardly.

Figure 10:
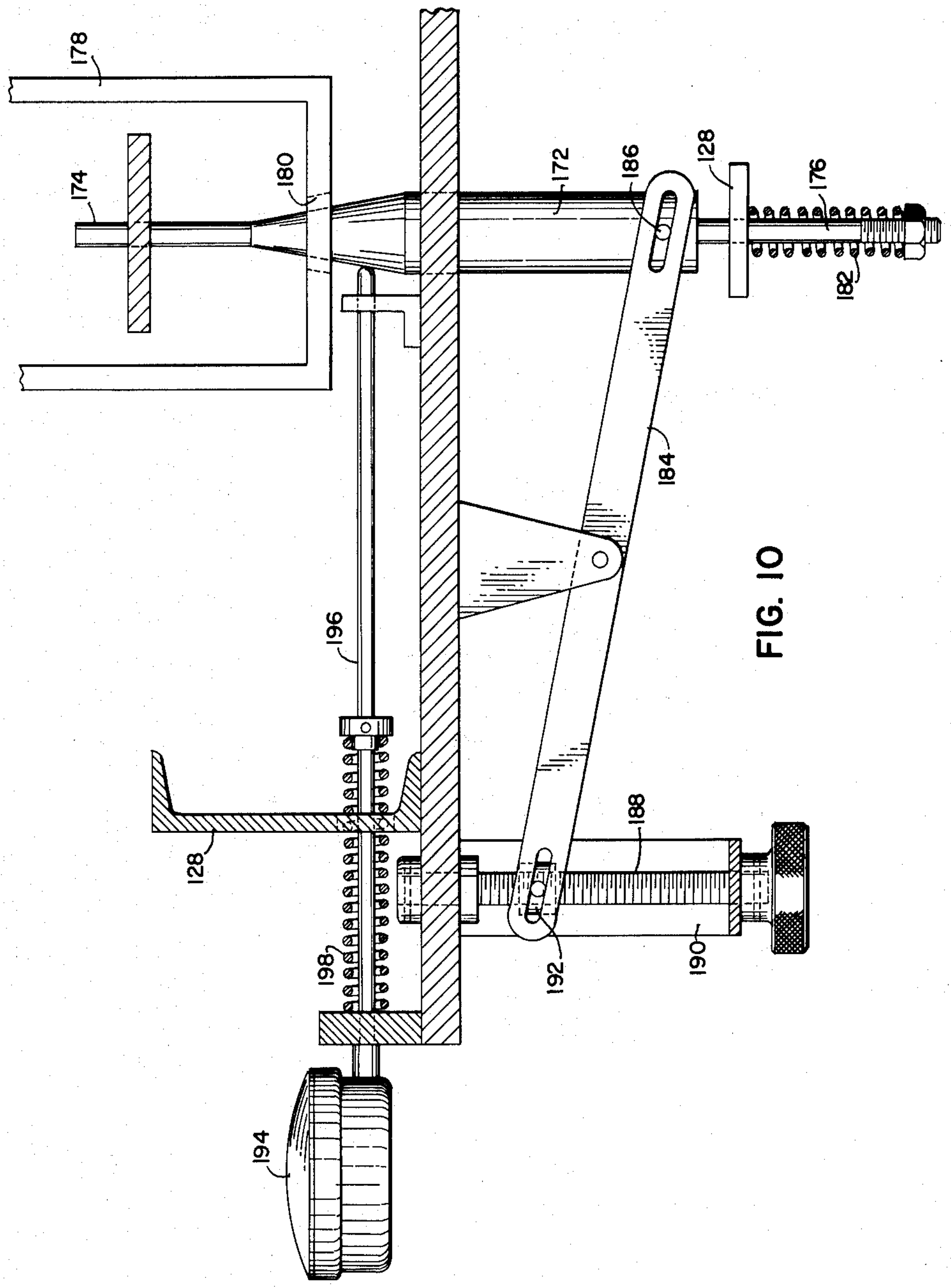
FIG. 10 is a sectional view showing the adjusting mechanism of the movement control cone of the easel of FIG. 7 taken along the line 10—10.

The cone adjusting mechanism shown in FIG. 10 contains a lever 184 pivoted at its mid-point to a downward extension of the frame 128. Pin 186 diametrically extends through the cone into longitudinally extending slots in the end of the lever to permit the oscillatory movement of the lever to vertically reciprocate the cone 172. The position of the lever is controlled by a screw 188. The screw 188 is vertically mounted at one end in the frame and at the other end by a bracket 190. A nut 192 having horizontal extending portions pivotally connects the other end of the lever 184 to the screw. Movement of the nut on the screw by the rotation of the screw rotates the lever 184 about its pivot point thereby controlling the vertical position of the cone 172.

An indicator gage 194 by means of a feeler rod 196 biased by a spring 198 into engagement with the cone portion of the cone 172 provides a visual and accurate determination of the vertical position of the cone 172. The reading on the indicator 194 is a function of the amplitude of the movement of the plate 144.

Figure 9:
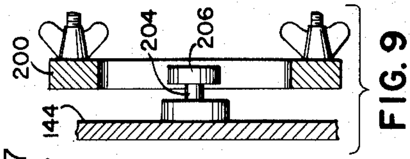
FIG. 9 is a section view of the template mechanism on the easel of FIG. 8 taken along the line 9—9.

Referring to FIGS. 8 and 9, there is shown a template mechanism 200 secured to the rod 146 by means of a clamp 202. The template is used to provide the movable plate 144 with non-circular movement such as rectangular, sinusoidal, triangular, and diagonal motion. A cam follower 204 having a rotatable head 206 extends into the recess formed by the template 200. The head 206 engages the template edges to control the movement of the plate 144 in accordance therewith.

In order to enable the apparatus to permit the operator to expose reference points on the light sensitive film carried by the movable plate 144, a lock pin 208, as shown in FIG. 7, extends through the stationary plate 134 and the movable plate 144. The lock pin holds these plates in a fixed relationship. After the reference points have been established, the pin 208 is removed thereby permitting the plate 144 to move relative to the stationary plate 134.

While there have been shown, described, and pointed out the fundamental novel features of the invention as applied to the preferred embodiments, it will be understood that various omissions, substitutions, changes in form, and details of the apparatus and method illustrated may be made by those skilled in the art, without departing from the spirit of the invention. It is intended to be limited only as indicated by the scope of the following claims.

What is claimed is:

1. An easel for photo-light painting an image on a light sensitive film comprising a support, a floating plate positioned over the support, a sensitive film supporting plate, means adjustably mounting the film supporting plate on the floating plate, a transparent plate positioned on the support in juxtaposed relationship with said film supporting plate and adapted to hold a negative in close proximity thereto, bearing means mounted on said support and engaging the floating plate, said hearing means including an adjustable member operable to vary the distance between the floating plate and the support, first tapered male means secured to the support and extending toward the floating plate, second tapered male means eccentrically mounted on the support and extending toward the floating plate, complementary tapered female members secured to the floating plate and extending over the male means, one of said female members being magnetized, drive means operatively connected to the second tapered male means for rotating the same, and releasable means to hold the floating plate in a fixed position on the support.

2. In apparatus for photo-light painting an image on a light sensitive film the combination of a support frame, means affixed to the frame to support a negative film of the image in relation to the frame, a flat plate for holding a light sensitive film, means operatively attached to the frame and supporting one side of the flat plate in spaced face to face relation with the negative film, said means comprising a first pair of rods secured to the opposite side of the flat plate in spaced parallel relation, a second pair of rods extending transverse to the first pair of rods secured to the support frame in spaced parallel relation, and coupling means slidably connecting the first pair of rods to the second pair of rods at their point of intersection, a rotatable drive means, means to resiliently connect the drive means to the plate in eccentric relation substantially normal to the plane thereof, a cone mounted on the frame substantially normal to and extending towards the flat plate, and a female cam guide mounted to the plate and extending over the cone whereby a circuitous path of the movement of the flat plate is defined upon actuation of the drive means.

3. In an apparatus to contact print an image on a light sensitive film the combination of a base frame, a negative holding plate mounted in substantially spaced horizontal relation on the top of the base frame, a film holding plate between the negative holding plate and the frame and substantially parallel thereto, a cam guide mounted on the film holding plate, a first pair of rods mounted in spaced parallel relation on the side of the film holding plate adjacent the frame, a second pair of rods mounted on the top of the frame in substantially transverse relation to the first pair of rods defining a criss-crossed intersection therewith, coupling means connecting the first pair of rods to the second pair of rods in sliding relation to each other at their intersecting points, rotatable drive means mounted on the frame substantially normal to the film holding plate, offset means connecting the drive means to the film holding plate and in eccentric relation thereto so the plate is moved in a circuitous path upon actuation of the drive means, said means being resilient in a plane substantially parallel to the plate, and normally urged to a large eccentric relationship between the film holding plate and the drive means, and cone means operatively connected to the frame and engaging the cam guide on the film holding plate to limit the eccentric relation of the offset means to control the circuitous movement of the film holding plate.

4. An apparatus according to claim 3 which includes means to withdraw a vacuum on the side of the film holding plate adjacent the negative holding plate to hold a light sensitive film in a flat position against such side.

5. An apparatus according to claim 3 which includes means to adjust the cam guide means and measure the adjustability thereof to define the circuitous movement of the film holding plate, and feeler means to provide a visual and accurate determination of the adjusted position of the cam guide means.

6. Apparatus for photo-light painting an image on a light sensitive film comprising means for holding a negative film of the image, a flat smooth surface plate for holding a light sensitive film, means including a frame supporting the plate in spaced parallel face to face relationship with the negative film, including a first pair of parallel rods secured to opposite sides of the plate, a second pair of parallel rods extending transverse to the first pair of rods secured to the frame, and coupling means slidably connecting the first pair of rods to the second pair of rods at their point of intersection thereby fixing the plate and frame in angular relation to each other, drive means operatively connected to the plate to move the plate in an endless circuitous path in a plane substantially parallel to the plane of the negative film so the films remain in the same angular relation to each other, said plate moved about an axis offset from the center of the plate whereby a source of light passing through the negative film will paint an image on the light sensitive film, and a vertically adjustable cone engaging a portion of the plate to control the circuitous path of movement thereof.

7. An apparatus according to claim 6 which includes means to draw a vacuum on the plate to hold a light sensitive film in a flat position against the plate.

References Cited by the Examiner

UNITED STATES PATENTS

| | | | |
|---|---|---|---|
| 1,176,384 | 3/16 | Lotka | 96—46 |
| 1,575,408 | 3/26 | Bassani | 96—45 |
| 2,286,883 | 6/42 | Weber. | |
| 2,488,091 | 11/49 | Meech. | |
| 2,776,595 | 1/57 | Schumacher. | |
| 2,931,723 | 4/60 | Clark | 96—27 |
| 2,981,147 | 4/61 | Carter et al. | 96—27 |
| 3,065,681 | 11/62 | Bornemann et al. | 96—27 |

NORMAN G. TORCHIN, *Primary Examiner.*